R. T. LAACKE.
ANIMAL COVER.
APPLICATION FILED JUNE 28, 1920.

1,398,381.

Patented Nov. 29, 1921.

Inventor:
Richard T. Laacke,
By Bottum, Bottum, Hucknell & Fischer
Attorneys.

UNITED STATES PATENT OFFICE.

RICHARD T. LAACKE, OF MILWAUKEE, WISCONSIN.

ANIMAL-COVER.

1,398,381.   Specification of Letters Patent.   Patented Nov. 29, 1921.

Application filed June 28, 1920. Serial No. 392,403.

*To all whom it may concern:*

Be it known that I, RICHARD T. LAACKE, a citizen of the United States, residing at Milwaukee, in the county of Milwaukee and State of Wisconsin, have invented certain new and useful Improvements in Animal-Covers, of which the following is a specification, reference being had to the accompanying drawing, forming a part thereof.

This invention relates more particularly to the rear portions of blankets or covers for cattle, horses and the like, and to means for holding them securely in place on such animals.

Its main objects are to allow the skirts at the rear end of the cover to hang freely from the hips of an animal without folds or wrinkles so that they will protect the thighs and flanks of the animal from soil and flies, avoid discomfort to the animal and interference with milking when the cover is used on a cow, for which it is particularly designed, and at the same time to securely hold the rear end of the cover in proper position over the hips and prevent it from shifting from side to side.

It consists in the construction, arrangement and combination of parts as hereinafter particularly described and pointed out in the claims.

In the accompanying drawing like characters designate the same parts in both figures.

Figure 1:
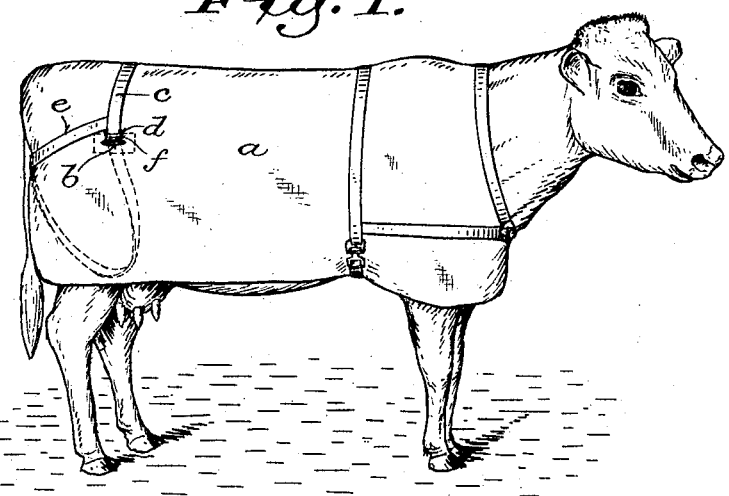
Figure 2:
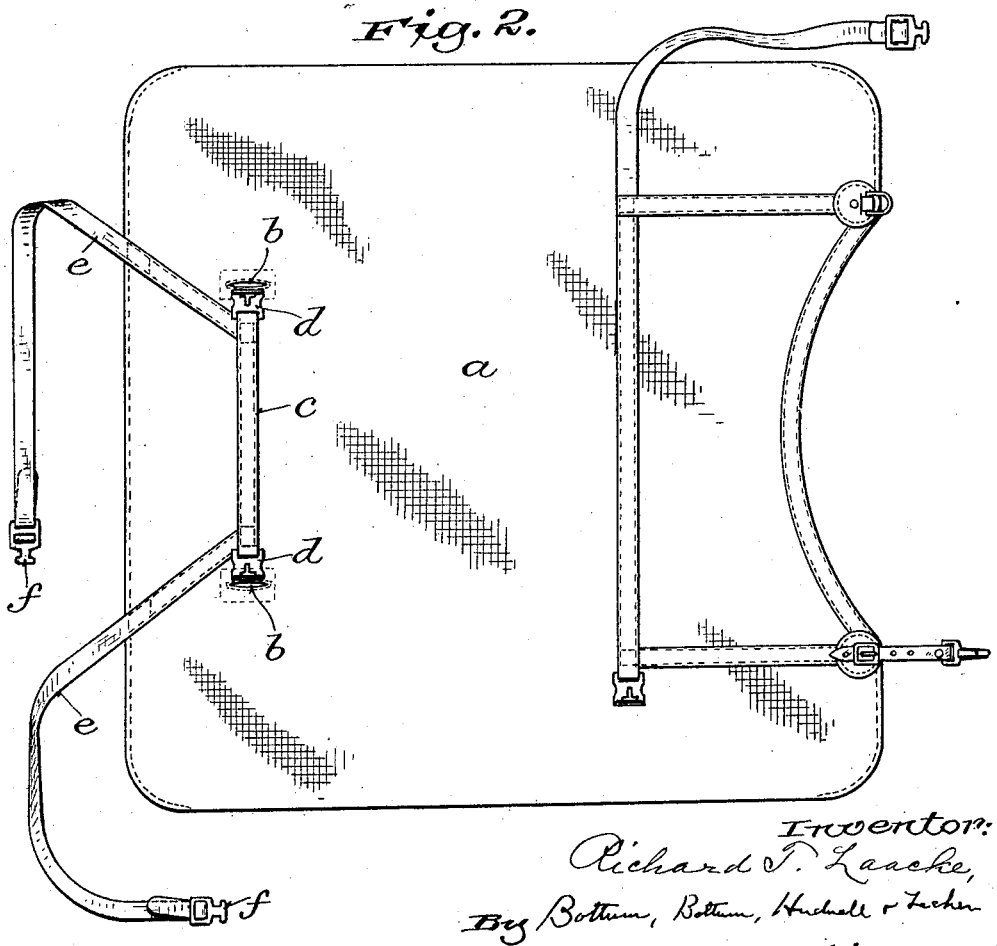

Figure 1 is a perspective view of a cover embodying the invention as applied to a cow; and Fig. 2 is a plan view of the cover spread out flat.

The cover comprises a blanket, $a$, which may be made of any suitable material such as duck, and of substantially quadrangular form, as shown in Fig. 2.

The front end of the blanket is shaped as usual, to approximately fit the neck of the animal on which it is designed to be used, and is provided with the usual or any suitable stays and fastenings for holding it in place.

Adjacent its rear end on opposite sides of, adjacent and equidistant from its longitudinal center, the blanket is formed with slits or hip openings $b$. These openings are preferably reinforced, as indicated by dotted lines in Fig. 2, especially when the blanket is made of light material, with patches of cloth or other suitable material, stitched or fastened to the inner side of the blanket.

A transverse back stay $c$, of webbing or other suitable material, is preferably stitched or otherwise fastened to the outside of the blanket between the openings $b$, and is provided at the ends with fastening members $d$.

Leg bands or stays $e$, of webbing or other suitable material, are attached at one end by stitching or otherwise, to the rear end of the blanket, extending from points adjacent the ends of the back stay $c$ and the openings $b$ obliquely rearward and outward across the rear edge of the blanket, and of proper length to pass downwardly and forwardly inside of the hind legs of the animal and thence upwardly inside of the skirts of the blanket through the openings $b$.

The outer loose or free ends of the stays $e$ are provided with fastening members $f$, adjustably connected therewith and adapted for engagement with the members $d$ to detachably connect the ends of the stays encircling the hind legs of the animal, as shown in Fig. 1.

For the sake of strength and stability, the ends of the leg stays $e$, which are permanently attached to the rear end of the blanket on the outer side thereof, are preferably stitched or otherwise fastened with the back stay $c$ to the blanket adjacent the openings $b$, so that when the fastening members $d$ and $f$ are connected, the hind legs of the animal will be completely encircled by the stays.

When the cover is placed and fastened on an animal as shown in Fig. 1, the skirts at the rear end will hang loosely and smoothly from the hips over the thighs and flanks of the animal, and the rear end of the cover will be prevented from shifting sidewise and will be securely held in proper position on the animal.

By forming openings in the cover or blanket adjacent the hips of the animal and passing the stays $e$ upwardly from the hind legs of the animal inside of the cover or blanket through the openings, the rear corners or skirts are allowed to hang freely and smoothly, and are prevented from being held by the stays in a folded or wrinkled condition so as to expose the thighs and flanks of the animal to soil and flies and to cause the animal discomfort.

The rear corners or skirts of the cover or blanket hanging freely from the hips of the animal outside of the leg stays *e* below the openings *d*, while affording the desired protection to the thighs and flanks of the animal against soil and flies, do not interfere with easy access to the udder of a cow for milking.

Variations in the minor details of construction and arrangement of the stays and fastenings may be made without departure from the principle and scope of the invention as defined in the following claims.

I claim:

1. An animal cover comprising a blanket formed adjacent its longitudinal center and over the hips with openings, leg stays attached to the rear end of the blanket on each side of and adjacent the longitudinal center thereof and adapted to pass downwardly and forwardly inside of the hind legs of an animal and thence upwardly through said openings, and fastenings for detachably connecting the other ends of the stays with the blanket adjacent said openings.

2. An animal cover comprising a blanket formed adacent the rear end on each side of the longitudinal center with openings and provided between said openings with a transverse back stay having fastening members at the ends, the leg stays attached at one end to the back stay adjacent said openings and adapted to pass therefrom rearwardly, downwardly and forwardly inside of the hind legs of an animal and thence upwardly through said openings and having fastening members for detachable engagement with the fastening members of the back stay.

3. An animal cover comprising a blanket formed adjacent and equidistant from its longitudinal center and over the hip portions with reinforced openings, leg stays attached at one end to the rear end of the blanket adjacent said openings and extending rearwardly and obliquely downward therefrom across the rear edge of the blanket and adapted to pass therefrom downwardly and forwardly inside of the hind legs of an animal and thence upwardly underneath the blanket through said openings, and fastenings for detachably connecting the loose ends of the stays with the ends permanently attached to the blanket adjacent the openings on the outside of the blanket.

4. An animal cover comprising a blanket formed adjacent and equidistant from its rear edge and longitudinal center with hip openings and provided with fastening members adjacent said openings, leg stays attached to the rear end of the blanket adjacent said openings and adapted to pass downwardly and forwardly inside of the hind legs of an animal and thence upwardly through said openings, and fastening members adjustably connected with the loose ends of the stays and adapted for detachable engagement outside of the blanket with the other fastening members adjacent the hip openings.

In witness whereof I hereto affix my signature.

RICHARD T. LAACKE.